(12) United States Patent  
Chien

(10) Patent No.: US 7,330,351 B2  
(45) Date of Patent: Feb. 12, 2008

(54) MOBILE POWER ADAPTER

(75) Inventor: Chi-Ming Chien, Taipei (TW)

(73) Assignee: Seventeam Electronics Co., Ltd., Taipei (TW)

( * ) Notice: Subject to any disclaimer, the term of this patent is extended or adjusted under 35 U.S.C. 154(b) by 106 days.

(21) Appl. No.: 11/279,755

(22) Filed: Apr. 14, 2006

(65) Prior Publication Data

US 2007/0242419 A1    Oct. 18, 2007

(51) Int. Cl.  
*G06F 1/20* (2006.01)

(52) U.S. Cl. ............... 361/687; 320/112; 455/501; 363/144

(58) Field of Classification Search ........... 320/112, 320/113, 128; 439/651; 363/501, 144; 455/569.2, 455/557, 99; 713/300, 502; 361/679–687, 361/724–727  
See application file for complete search history.

(56) References Cited

U.S. PATENT DOCUMENTS

| 5,744,934 A * | 4/1998 | Wu ........................ 320/111 |
| 5,762,525 A * | 6/1998 | Candeloro ............... 439/660 |
| 2004/0057204 A1* | 3/2004 | Yin et al. ............... 361/686 |
| 2006/0013027 A1* | 1/2006 | Su .......................... 363/144 |

* cited by examiner

*Primary Examiner*—Hung Van Duong

(57) ABSTRACT

A mobile power adapter having an electric socket for power input, multiple adapter ports for power output, a power supply unit for converting input power supply into desired output power supply for output through the adapter ports, and a monitoring unit for monitoring the temperature inside the mobile power adapter and the operation status of the power supply unit on electric voltage, electric current, power consumption status and total wattage for enabling the monitoring data to be displayed on a display screen on the outside wall of a housing of the mobile power adapter.

5 Claims, 7 Drawing Sheets

MOBILE POWER ADAPTER

BACKGROUND OF THE INVENTION

1. Field of the Invention

The present invention relates to a power adapter and more particularly, to a mobile power adapter, which is connectable to a computer to provide power supply to various peripheral apparatus inside the computer and, which monitors various items including temperature, fan speed, electric voltage, electric current, power consumption status and total wattage.

2. Description of the Related Art

Following fast development of electronic technology, electronic devices are made having the characteristic of small size, and a relatively greater number of electronic devices is allowed to be installed in a unit area to enhance the performance. However, when an electronic apparatus is in operation, much heat is produced, and heat must be quickly carried away to maintain normal functioning of the electronic apparatus. Excessively high temperature causes the electronic device to generate ionized electrons and thermal stress, lowering system stability and shoring the service life of the electronic device. Therefore, heat dissipation is important.

Further, personal computer is popular in the modern society, and the life cycle of computer generation is short. Modern computers use high performance power devices and have a high data processing speed. In consequence, high performance power devices generate much heat during operation. If heat is not quickly carried away during the operation of a power device, the power device may fail, and important data may lose. However, regular computers commonly have the power adapter mounted on the inside. Because the internal space of a computer is narrow, it is difficult to quickly dissipate heat from the power adapter during the operation of the computer, and heat energy tends to be accumulated in the computer. Further, the user cannot know the operation status of the power adapter and its ambient temperature during the operation of the computer. When the power adapter is unstable or the ambient temperature is excessively high, the user doesn't know to take the necessary measures to eliminate further possible damage. Further, because the power adapter is mounted inside the computer and has many electric wires respectively connected to different component parts inside the computer, it is difficult to repair the internal circuits of the computer. Because numerous electric wires are arranged in a limited space inside the computer and not well marked individually, the electric wires may be connected to wrong component parts during a repair work, resulting damage to the computer.

Therefore, it is desirable to provide a design that eliminates the aforesaid problems.

SUMMARY OF THE INVENTION

The present invention has been accomplished under the circumstances in view. According to one aspect of the present invention, the mobile power adapter comprises a housing, a display screen on one side of the housing, an electronic connection board on the opposite side of the housing, the electronic connection board having an electric socket for receiving an external power source and a plurality of adapter ports for power output to various external electric devices, a power supply unit mounted inside the housing and electrically connected between the electric socket and the adapter ports, a cooling unit formed of a heat sink and a fan and mounted inside the housing, and a monitoring unit mounted inside the housing for monitoring the temperature inside the housing, the revolving speed of the fan, and the operation status of the power supply unit on electric voltage, electric current, power consumption status and total wattage for display on the display screen.

According to another aspect of the present invention, the invention further comprises an adapter board, which is mounted on a back side of a computer and has a plurality of distribution cables respectively connected to various peripheral apparatus inside the computer, and an adapter cable for connecting one adapter port of the electronic connection board on the housing to the adapter board to transmit output power supply from the mobile power adapter to the peripheral apparatus of the computer through the adapter board.

DETAILED DESCRIPTION OF THE PREFERRED EMBODIMENT

Figure 1:
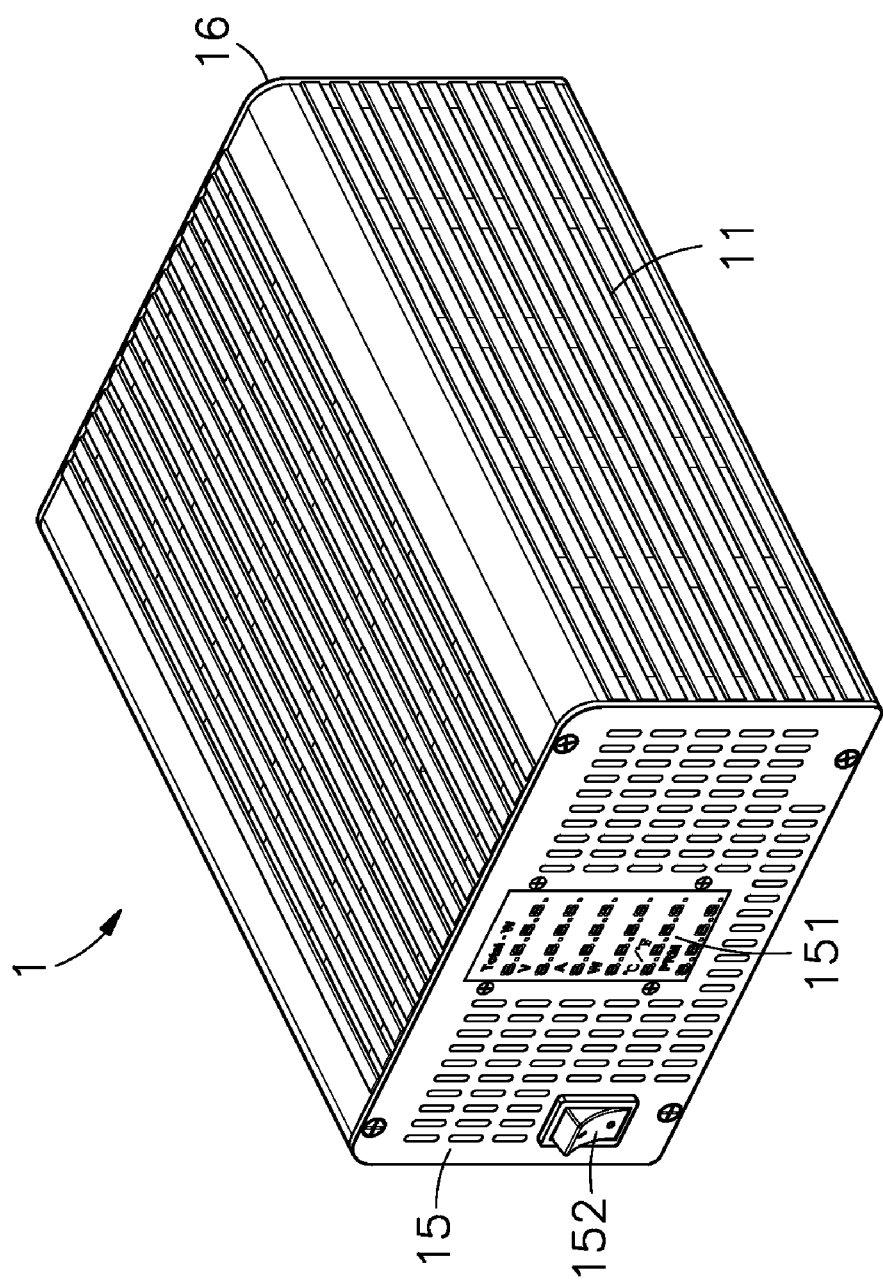
FIG. 1 is an oblique front elevation of a mobile power adapter according to the present invention.
Figure 2:
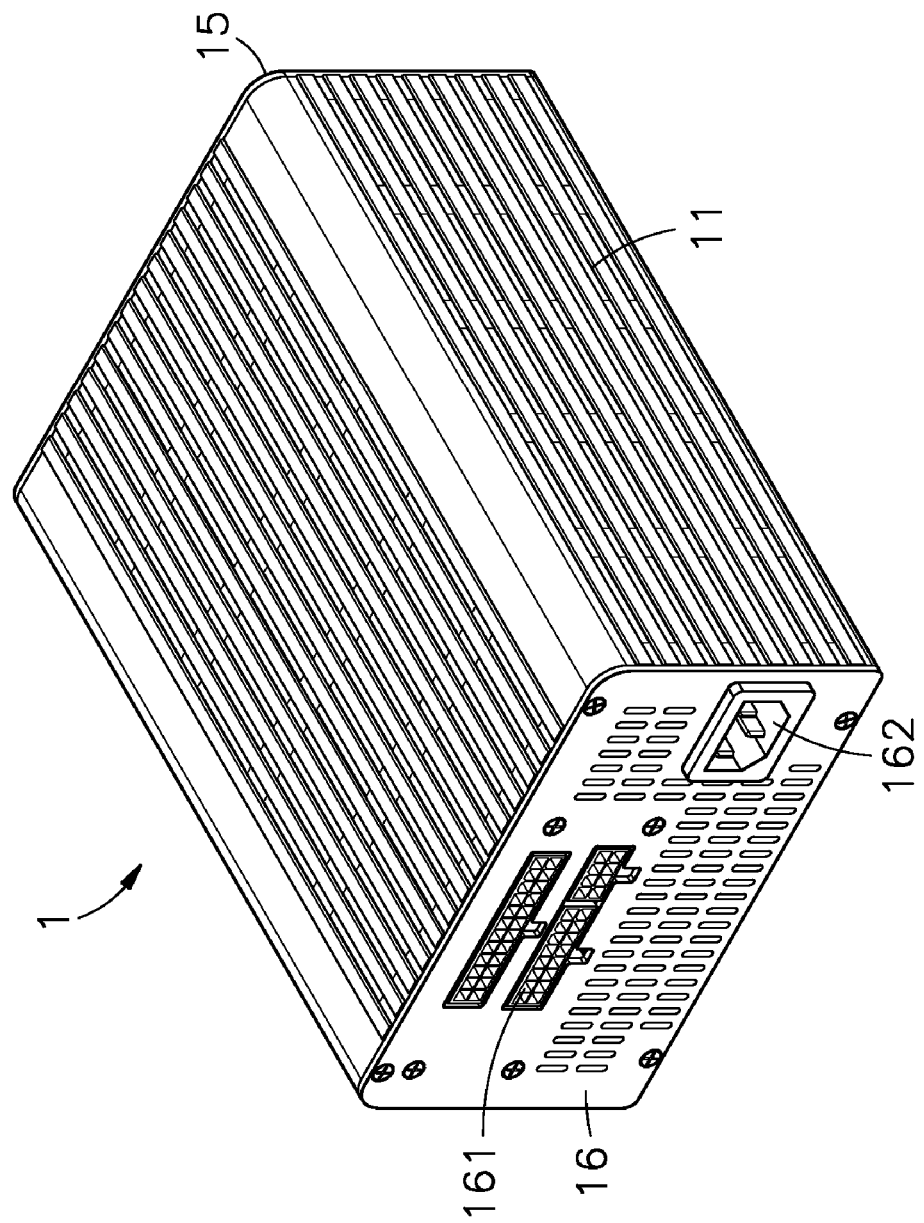
FIG. 2 is an oblique rear elevation of the mobile power adapter according to the present invention.
Figure 3:
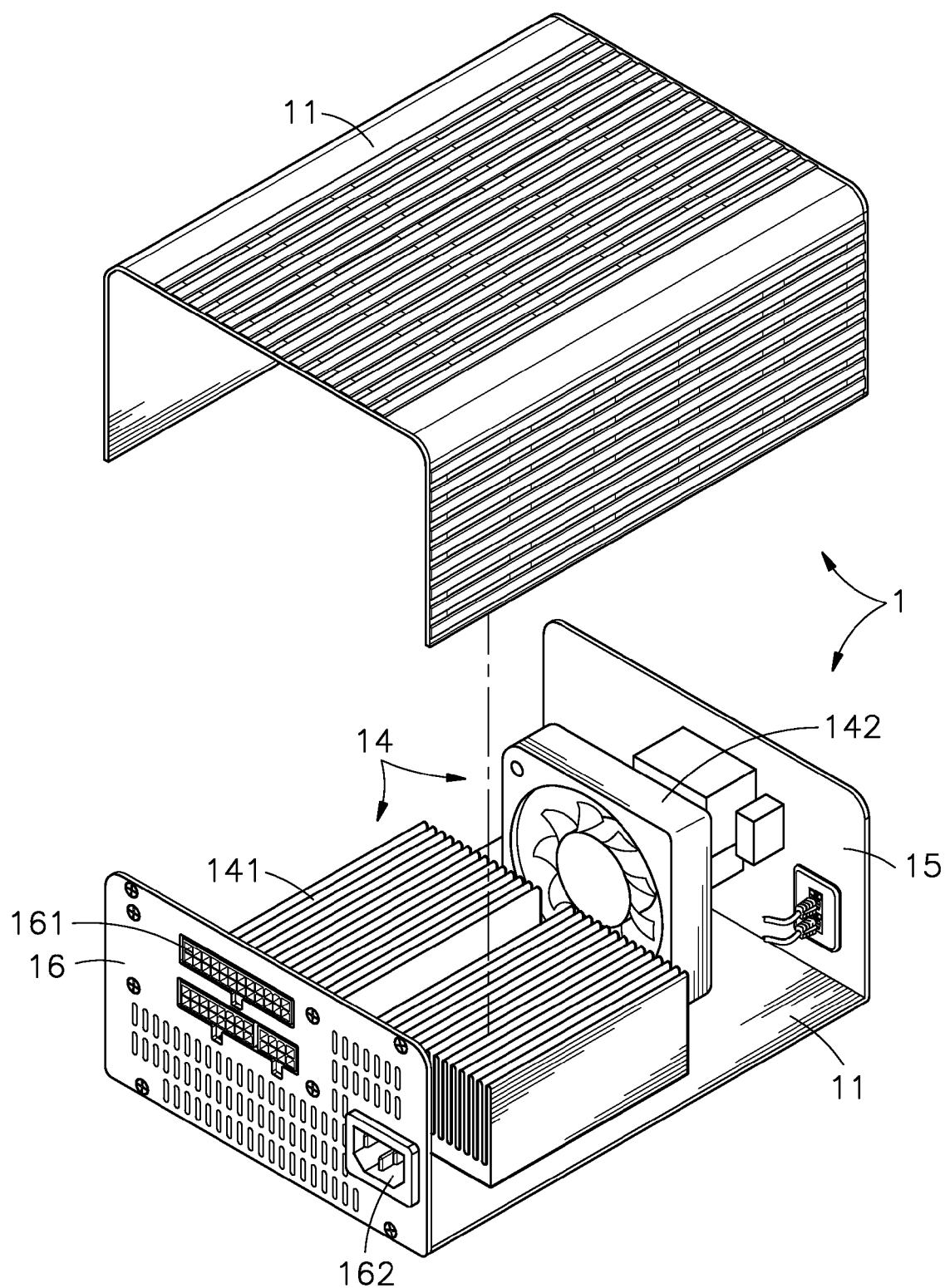
FIG. 3 is an exploded view of the mobile power adapter according to the present invention.
Figure 4:
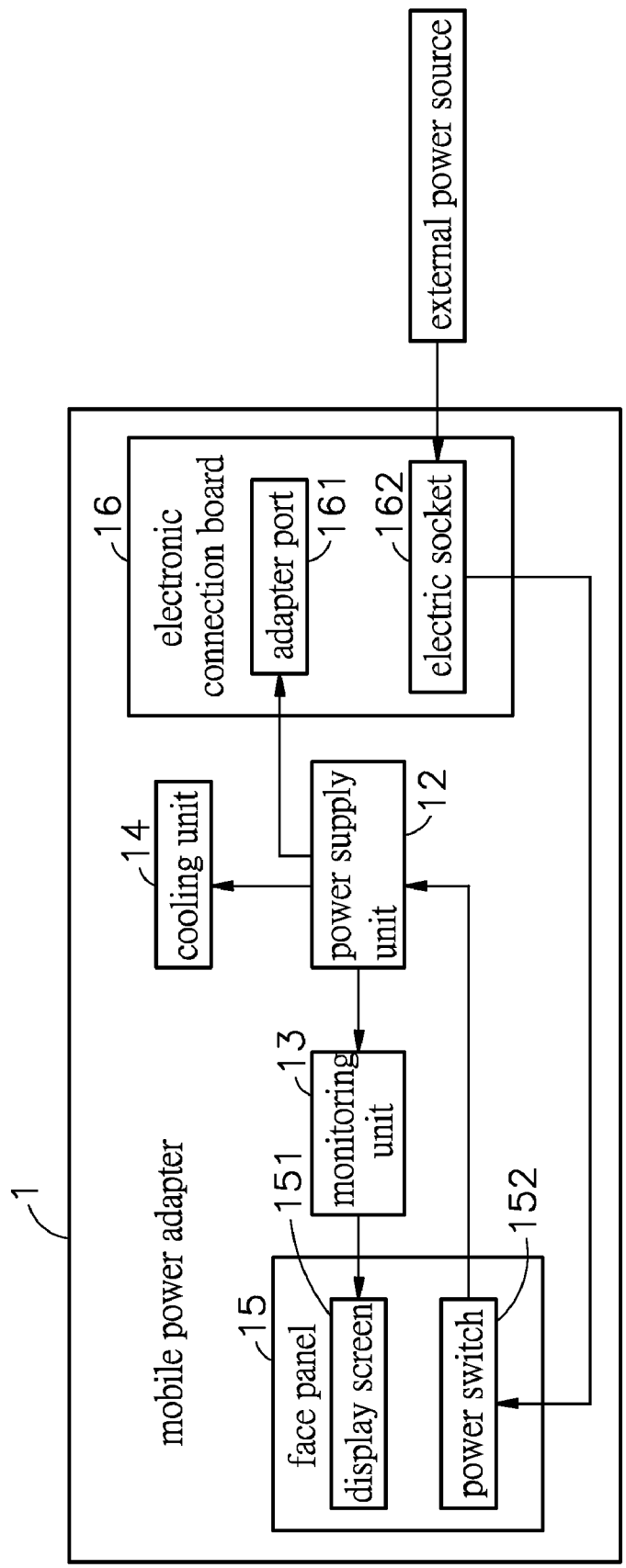
FIG. 4 is a circuit block diagram of the mobile power adapter according to the present invention.
Figure 5B:
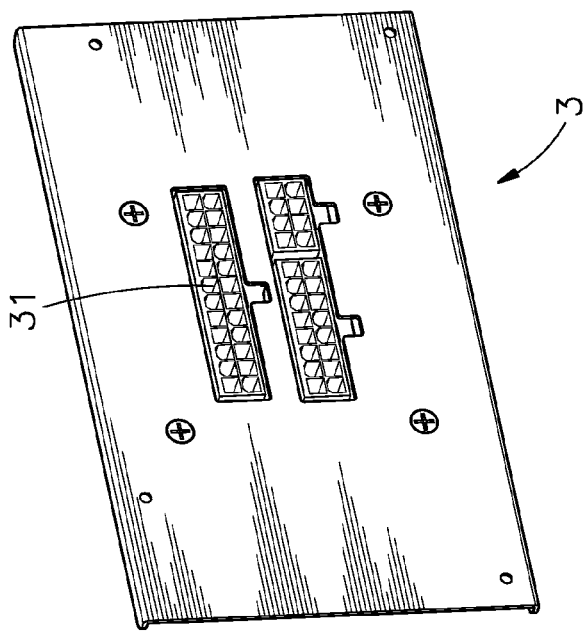
FIG. 5B is a front elevation of the external adapter board according to the present invention.
Figure 5A:
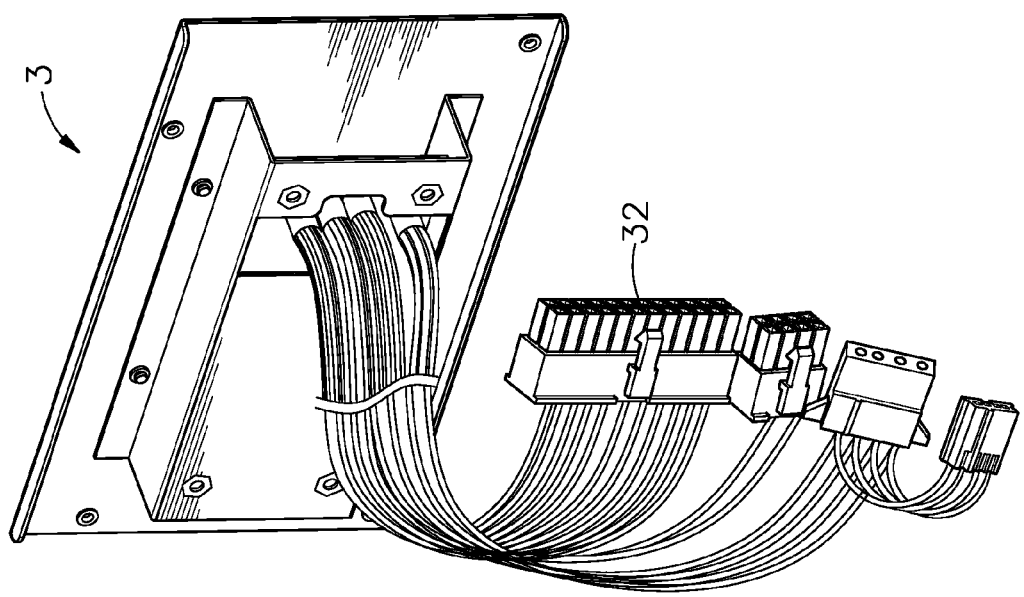
FIG. 5A is a rear elevation of an external adapter board according to the present invention.
Figure 6:
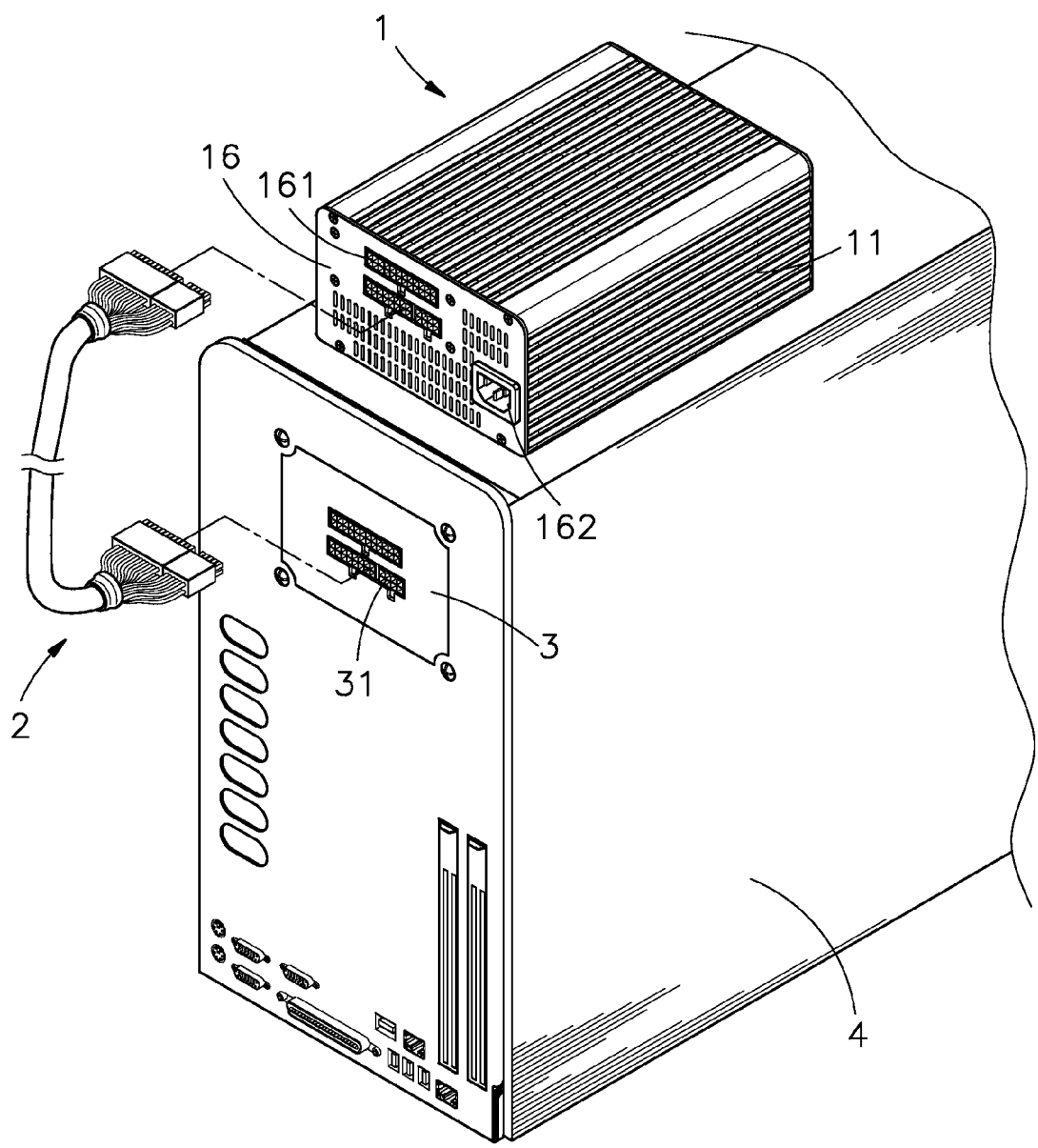
FIG. 6 is a schematic drawing showing an application example of the present invention.

Referring to FIGS. 1 through 4, a mobile power adapter 1 in accordance with the present invention is shown comprising a housing 11, a power supply unit 12, a monitoring unit 13, and a cooling unit 14. The cooling unit 14 is formed of a heat sink 141 and a fan 142. The housing 11 houses the power supply unit 12, the monitoring unit 13, and the cooling unit 14. The housing 11 has a face panel 15 disposed at one side, and a display screen 151 on the face panel 15. The display screen 151 is electrically connected to the monitoring unit 13 to monitor temperature, fan speed, voltage, current, power consumption, and total wattage. Further, a power switch 152 is mounted on the face panel 15, and adapted to switch on/off the power supply unit 12. An electronic connection board 16 is provided at one side of the housing 11 remote from the face panel 15. The electronic connection board 16 has a plurality of adapter ports 161 and an electric socket 162. An adapter cable 2 may be used to electrically connect one adapter port 161 of the electronic connection board 16 to one port 31 of an external adapter board 3, which is mounted on a rear side of a computer 4 and has distribution cables 32 respectively connected to the internal peripheral apparatus 41 of the computer 4 (see FIGS. 5A, 5B and 6).

Figure 7:
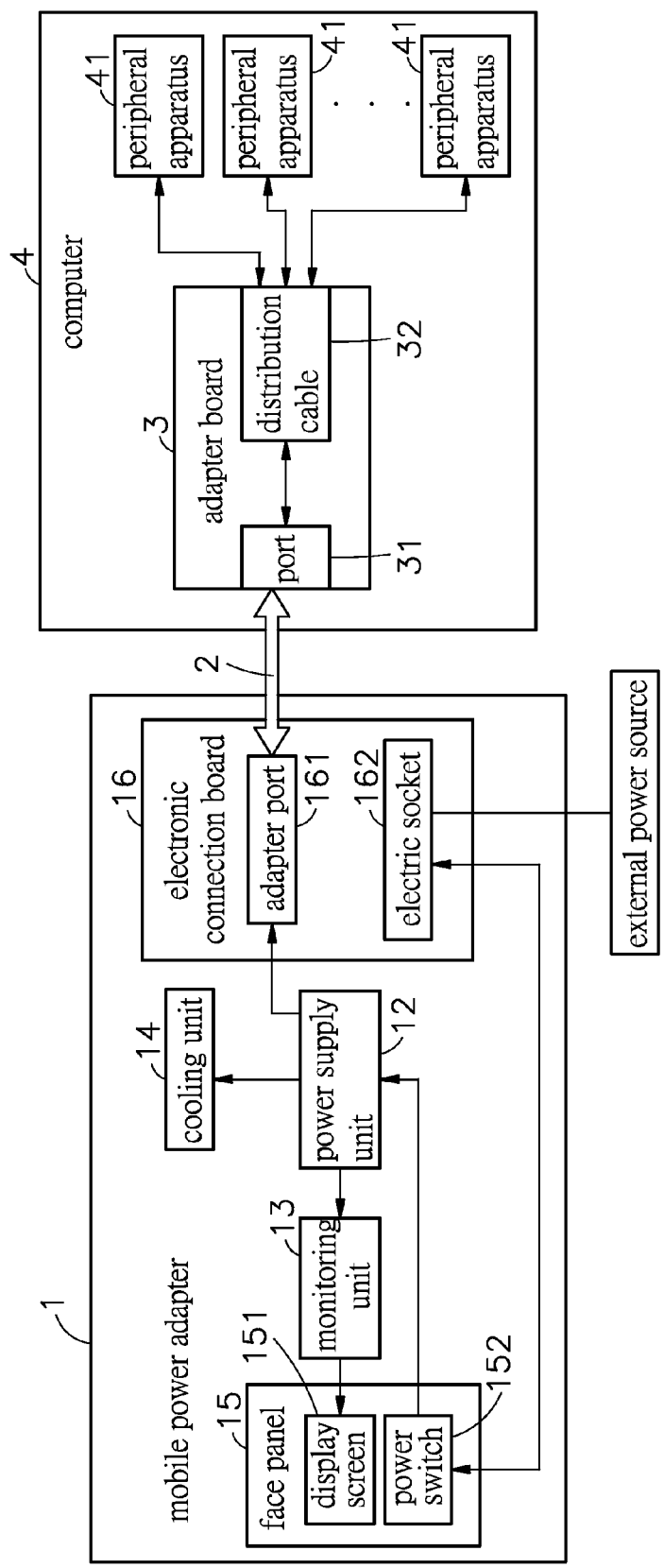
FIG. 7 is a circuit block diagram showing the application of the present invention.

When in use, the mobile power adapter 1 is set outside the computer 4 (see FIGS. 6 and 7), and then the distribution cables 32 are respectively connected to the various peripheral apparatus 41 (such as motherboard, hard diskdrive, floppy diskdrive, CD-ROM, etc.). By means of the adapter board 3, the distribution cables 32 are gathered and connected to the mobile power adapter 1 through the adapter cable 2, preventing tangling of external cables. When the electric socket 162 is connected to an external power source, the power switch 152 is switched on to start the power supply unit 12, the monitoring unit 13 and the cooling unit 14, allowing the power supply unit 12 to convert the input power supply into the designed output power and to transmit the output power to the peripheral apparatus 41 of the computer 4 through the electronic connection board 16, the adapter cable 2, the adapter board 3 and the distribution cables 32. During output of power supply from the mobile power adapter 1 to the computer 4, the monitoring unit 13 monitors the internal temperature of the mobile power adapter 1 and the fan speed of the fan 142 as well as the operation of the power supply unit 12 on electric voltage, electric current, power consumption status, and total wattage, and sends the motoring data to the display screen 151 on the face panel 15 for display so that a user knows the operation status of the mobile power adapter 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mobile power adapter comprising:
   a housing, said housing having a face panel on a first side thereof and an electronic connection board on a second side thereof opposite to said first side, said face panel comprising a display screen for displaying data, said electronic connection board comprising a plurality of adapter ports for power output to external electric devices and an electric socket for receiving an external power source;
   a power supply unit mounted inside said housing and electrically connected between said electric socket and said adapter ports for converting the input power supply received from said electric socket into desired output power for output to said external electric devices through said adapter ports; and
   a monitoring unit mounted inside said housing and electrically connected between said power supply unit and said display screen and adapted to monitor the temperature inside said housing and the operation status of said power supply unit on electric voltage, electric current, power consumption status and total wattage and to provide the monitoring data to said display screen for display.

2. The mobile power adapter as claimed in claim 1, wherein said housing further houses a cooling unit comprised of a heat sink and a fan; said monitoring unit further monitors the revolving speed of said fan.

3. The mobile power adapter as claimed in claim 1, further comprising a power switch mounted on said face panel and adapted to switch on/off said power supply unit.

4. The mobile power adapter as claimed in claim 1, further comprising an adapter board mounted on a back side of a computer, said adapter board comprising at least one port disposed at a front side thereof and electrically connectable to the adapter ports on said electronic connection board of said housing for receiving said output power from said power supply unit and a plurality of distribution cables disposed at a back side thereof and connectable to peripheral apparatus inside said computer for transmitting said output power to said peripheral apparatus to which said distribution cables are connected.

5. The mobile power adapter as claimed in claim 4, further comprising an adapter cable adapted to electrically connect one adapter port of the electronic connection board of said housing to one port of said adapter board.

* * * * *